April 23, 1935.  W. H. BASELT  1,998,976
CLASP BRAKE FOR RAILWAY CAR TRUCKS
Filed April 6, 1933   2 Sheets-Sheet 1
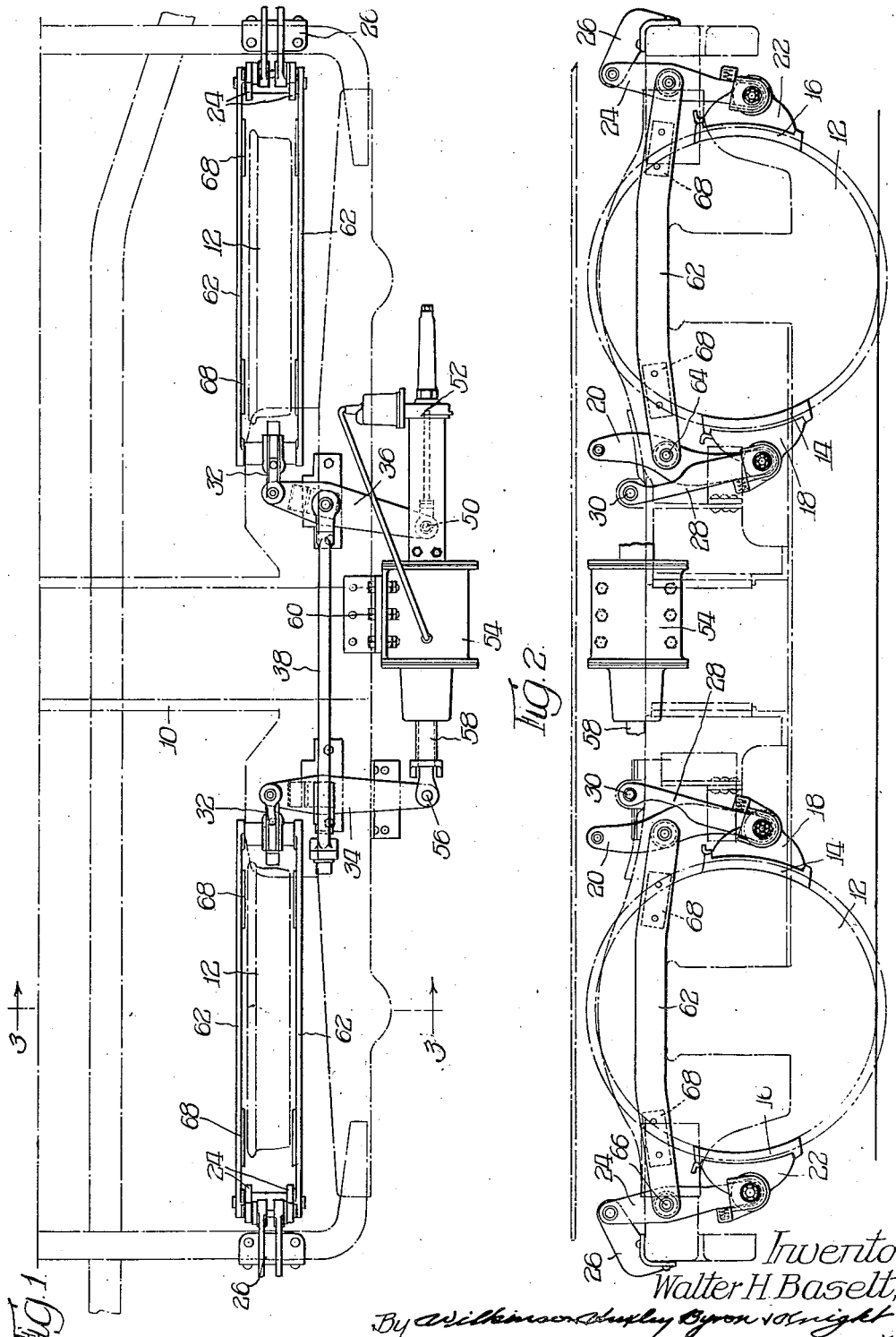

April 23, 1935. W. H. BASELT 1,998,976
CLASP BRAKE FOR RAILWAY CAR TRUCKS
Filed April 6, 1933 2 Sheets-Sheet 2
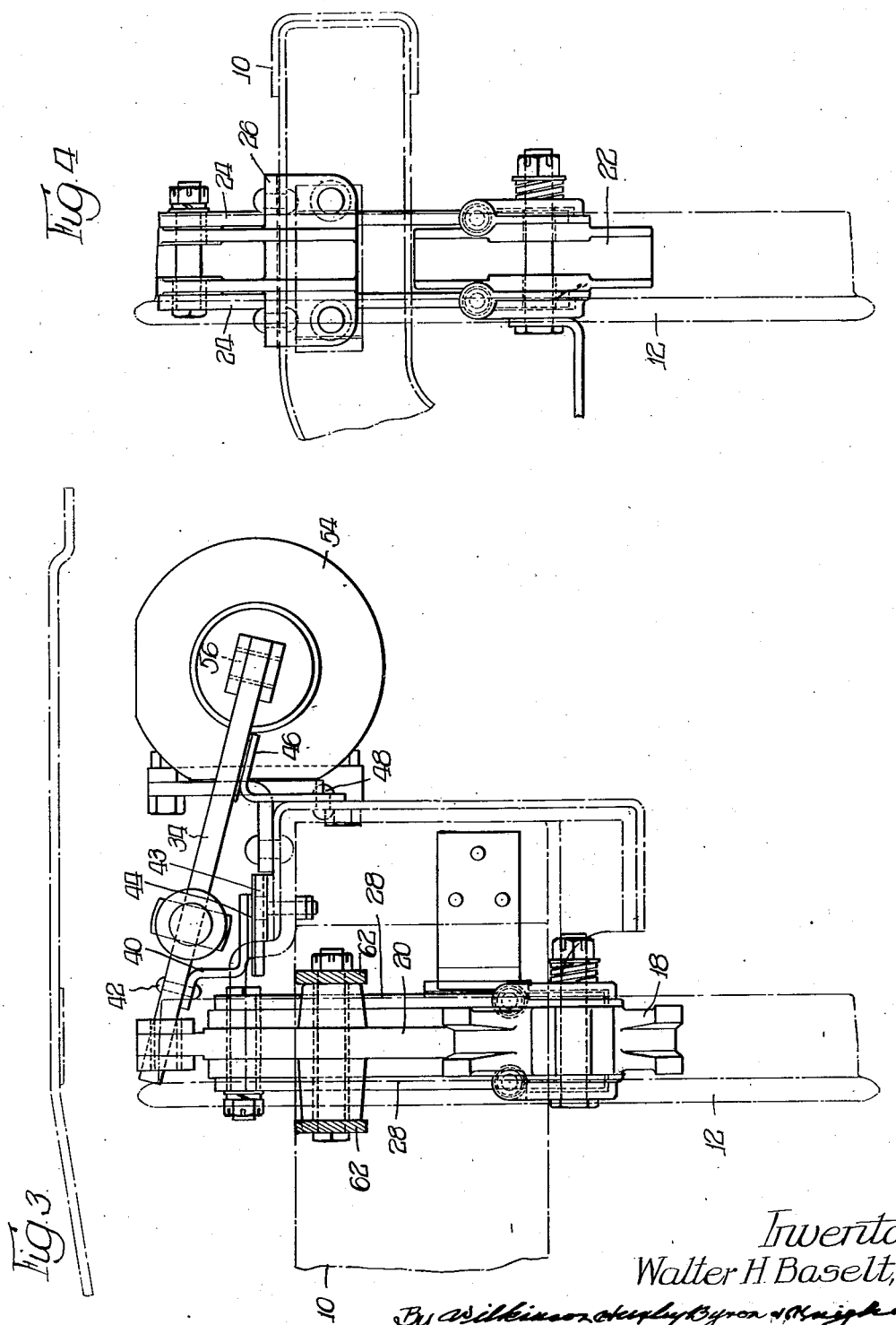
Inventor:
Walter H. Baselt, Patented Apr. 23, 1935

1,998,976

UNITED STATES PATENT OFFICE 1,998,976

CLASP BRAKE FOR RAILWAY CAR TRUCKS

Walter H. Baselt, Chicago, Ill., assignor to American Steel Foundries, Chicago, Ill., a corporation of New Jersey Application April 6, 1933, Serial No. 664,682

21 Claims. (Cl. 188—56)

This invention relates to improvements in brake rigging for railway car trucks either of the beam or beamless type and having associated therewith that type of brake known as a "clasp brake" in which a brake shoe is applied to opposite sides of a car wheel.

It is an object of the present invention to provide a brake rigging especially adapted to meet the conditions prevailing in railway motor trucks wherein it is necessary to provide sufficient space for the location of electric motors, generators and other equipment.

It is another object of the present invention to provide a brake rigging equipped with improved means for taking up the slack due to wear on the brake shoes and car wheels and particularly in which an automatic slack adjuster is provided for a dead cylinder lever and a manual slack adjuster is provided between the cylinder levers.

Another object of the present invention is to provide tie straps between the truck levers which embrace the wheels on opposite sides and which are furnished with renewable wear plates adjacent the points at which the wheels may contact with the straps.

With these and various other objects in view the invention may consist in certain novel features of construction and operation as will be more fully described and particularly pointed out in the specification, drawings and claims appended hereto.

In the drawings:

Figure 1 is a fragmentary plan view of a railway car truck embodying the features of the present invention;

Figure 2 is a side elevation of the arrangement shown in Figure 1, portions of the linkage being eliminated for clearness;

Figure 3 is a fragmentary sectional view taken substantially along line 3—3 of Figure 1, and Figure 4 is an end elevation of the arrangement shown in Figure 1.

The brake rigging of the present invention is shown as applied to a four-wheel truck comprising a truck frame 10 and wheels 12. The wheels are engaged on either side by inner and outer brake shoes 14 and 16, respectively. Brake heads 22 supporting the outside shoes 16 are pivotally carried by the dead truck levers 24. The levers 24 are pivotally supported at their upper ends upon brackets 26 fixed to the ends of the truck frame. The live truck levers 20 as well as the brake heads 18, which carry the inside shoes 14, are supported by hangers 28 which are pivotally secured on the truck frame at 30. The live truck levers 20 are pivotally carried on the brake heads 18 and their upper ends are pivotally connected to links 32. One of the links 32 is pivotally attached to the live cylinder or equalizing lever 34 while the other link is pivotally connected to the inner end of a dead cylinder or equalizing lever 36. The levers 34 and 36 are pivotally connected at points intermediate their ends by a manually adjustable slack take-up rod 38.

Each of the levers 34 and 36 has fixed thereto, as close as possible to the inner end thereof, a Z-shaped supporting bracket 40. One arm of the bracket 40 is shown attached by rivet 42 to the lever 34 in Figure 3. The other arm of the bracket 40 rests upon a bracket 43 carried by the truck frame. The respective brackets 40 and 43 have wear plates at their contacting surfaces 44. The live lever 34 is additionally supported adjacent its outer end by a V-shaped bracket 46 fastened to the truck frame by rivet 48.

The dead lever 36 is pivotally connected at its outer end 50 to an automatic slack take-up device 52. The automatic slack take-up adjuster 52 compensates for wear of the brake shoes while the manual slack take-up rod 38 provides for the slack caused by wheel wear. The live lever 34 is pivotally connected at 56 to the piston rod 58 of the cylinder 54. The cylinder 54 is preferably bolted to the frame, as shown at 60.

Tie rods or straps 62 are provided on each side of the wheels 12 and above the centers thereof for connecting the live truck levers 20 with the dead truck levers 24. Thus the tie rods 62 are pivotally connected at 64 intermediate the ends of the live levers 20 and are pivotally connected at 66 intermediate the ends of the dead levers 24. These connecting straps are provided with wear plates 68 made of hardened steel and used to prevent wear of the straps 62 through contact with the wheels. The wear plates 68, when badly worn, can be readily renewed. Due to clearance conditions in this type of truck it is substantially impossible to so locate the straps 62 that they cannot contact the wheels. On account of the location of parts and clearance conditions the brake cylinder levers 34 and 36, which carry the manual slack adjuster must be substantially supported to prevent interference with underlying parts and it is for this reason that the brackets 40 and 42 are provided.

It is to be understood that I do not wish to be limited by the exact embodiment of the device shown, which is merely by way of illustration and not limitation, as various other forms of the device will of course be apparent to those skilled in the art without departing from the spirit of the invention as ascertained from the scope of the appended claims.

I claim:

1. In a brake rigging the combination of a truck frame, wheels supporting said truck frame, live truck levers on one side of each wheel, dead truck levers on the other side of each wheel, tie straps connecting the dead and live truck levers, cylinder levers in connection with said live truck levers, means on the truck frame intermediate the cylinder levers for actuating the cylinder levers, and means for automatically adjusting one of said cylinder levers.

2. In a brake rigging the combination of a truck frame, wheels supporting said truck frame, live truck levers on one side of each wheel, dead truck levers on the other side of each wheel, tie straps connecting the live and dead truck levers, a live cylinder lever pivotally connected to one of said live truck levers, a dead cylinder lever pivotally connected to the other of said live truck levers, means on the truck frame intermediate said cylinder levers for actuating said cylinder levers, and means for automatically taking up slack by adjusting said dead cylinder lever.

3. In a brake rigging the combination of a truck frame, wheels supporting said truck frame, live truck levers on one side of each wheel, dead truck levers on the other side of each wheel, tie straps connecting the live and dead levers, cylinder levers adjustably connected intermediate their ends and in pivotal engagement at their inner ends with said live truck levers, means on the truck frame intermediate said cylinder levers for actuating said cylinder levers, and means for pivotally and automatically adjusting one of said cylinder levers.

4. In a brake rigging the combination of a truck frame, wheels supporting said truck frame, brake heads disposed at both sides of a wheel, a dead truck lever fulcrumed on said truck frame, a live truck lever pivotally connected to the brake head on the opposite side of said wheel, means connecting said truck levers and embracing said wheel, a dead lever connected at one end to said live truck lever, an automatic slack adjuster for the other end of the dead lever, and means for operating said dead lever.

5. In a brake rigging the combination of a truck frame, wheels supporting said truck frame, brake heads disposed at both sides of each wheel, a dead truck lever fulcrumed on said truck frame and fulcrumed to a brake head on one side of each wheel, a live truck lever pivotally connected to a brake head on the opposite side of each wheel, means connecting said truck levers and embracing said wheel, a live cylinder lever connected to one of said live truck levers, a dead cylinder lever connected to the other of said live truck levers, a slack adjuster connecting said live and dead cylinder levers, means for operating said live cylinder lever, a fulcrum for said dead cylinder lever, and means for automatically adjusting said fulcrum to take up slack.

6. In a brake rigging the combination of a truck frame, wheels supporting said truck frame, live truck levers on one side of each wheel, connecting means between said live truck levers, dead truck levers on the other side of each wheel, tie straps connecting said truck levers on each side of each wheel, said tie straps being provided with removable wear plates adjacent said wheels, and operating cylinder means connected to pairs of said live truck levers for controlling said rigging.

7. In a brake rigging the combination of a truck frame, wheels supporting said truck frame, live truck levers on one side of each wheel, dead truck levers on the other side of each wheel, means connecting the truck levers embracing the wheels, cylinder levers pivotally connected to said live truck levers, means on the frame located intermediate the cylinder levers for actuating said cylinder levers, and brackets carried by said cylinder levers for slidably supporting said cylinder levers on said truck frame.

8. In a brake rigging, the combination of a truck frame, spaced wheels associated therewith for supporting said frame, brake shoes disposed on each side of each wheel, dead and live truck levers arranged in pairs in supporting relation to said brake shoes, a pull rod connecting each pair of dead and live levers, cylinder levers operatively connected to said live truck levers, means on the frame intermediate the cylinder levers for actuating said cylinder levers, and a bracket carried by at least one of said cylinder levers for slidably supporting said cylinder lever on said truck frame.

9. In a brake rigging, the combination of a truck frame, spaced wheels associated therewith for supporting said frame, brake shoes disposed on each side of each wheel, dead and live truck levers arranged in pairs in supporting relation to said brake shoes, a pull rod connecting each pair of dead and live levers, cylinder levers operatively connected to said live truck levers, means on the frame intermediate the cylinder levers for actuating said cylinder levers, and an offset bracket fixed to and slidably supporting one of said cylinder levers on said truck frame.

10. In a brake rigging, the combination of a truck frame, spaced wheels associated therewith for supporting said frame, brake shoes disposed on each side of each wheel, dead and live truck levers arranged in pairs in supporting relation to said brake shoes, a pull rod connecting each pair of dead and live levers, cylinder levers operatively connected to said live truck levers, means on the frame intermediate the cylinder levers for actuating said cylinder levers, and brackets carried by each of said cylinder levers for slidably supporting said cylinder levers on said truck frame.

11. In a brake rigging, the combination of a truck frame, spaced wheels associated therewith for supporting said frame, brake shoes disposed on each side of each wheel, dead and live truck levers arranged in pairs in supporting relation to said brake shoes, a pull rod connecting each pair of dead and live levers, cylinder levers operatively connected to said live truck levers, means on the frame intermediate the cylinder levers for actuating said cylinder levers, and offset brackets carried by each of said cylinder levers for slidably supporting said cylinder levers on said truck frame.

12. In a brake rigging the combination of a truck frame, spaced wheels associated therewith for supporting said frame, brake shoes disposed on each side of said wheels, dead and live truck levers arranged in pairs associated with each wheel and in supporting relation with said brake shoes, a pull rod connecting each pair of dead and live truck levers, cylinder levers connected to the live truck levers and connected to each other, means for actuating one of said cylinder levers, and means on said cylinder levers engaging said truck frame for slidably supporting each of said cylinder levers on said truck frame substantially beneath the connection between said cylinder levers.

13. In a brake rigging the combination of a truck frame, spaced wheels associated therewith for supporting said frame, brake shoes disposed on each side of said wheels, dead and live truck levers arranged in pairs associated with each wheel and in supporting relation with said brake shoes, a pull rod connecting each pair of dead and live truck levers, cylinder levers connected to the live truck levers and connected to each other, means for actuating one of said cylinder levers, and means comprising offset brackets secured to each of said cylinder levers for slidably supporting said cylinder levers on said truck frame substantially beneath the connections between said cylinder levers.

14. In a brake rigging the combination of a truck frame, spaced wheels associated therewith for supporting said frame, brake shoes disposed on each side of said wheel, dead and live truck levers arranged in pairs associated with each wheel and in supporting relation with said brake shoes, pull rods connecting each pair of dead and live truck levers, a pair of cylinder levers connected to the live truck levers, a brake cylinder for operating one of said cylinder levers, and a slack adjuster connecting said cylinder levers.

15. In a brake rigging the combination of a truck frame, spaced wheels associated therewith for supporting said frame, brake shoes disposed on each side of said wheel, dead and live truck levers arranged in pairs associated with each wheel and in supporting relation with said brake shoes, pull rods connecting each pair of dead and live truck levers, a pair of cylinder levers connected to the live truck levers, a brake cylinder for operating one of said cylinder levers, an automatic slack adjuster for the other of said cylinder levers and a manual slack adjuster connecting said cylinder levers.

16. In a brake rigging, the combination of a truck frame, wheels supporting said truck frame, live truck levers on one side of each wheel, connecting means between said live truck levers, dead truck levers on the other side of each wheel, tie straps connecting said truck levers on each side of each wheel and above the wheel centers, and operating cylinder means connected to pairs of said live truck levers for controlling said rigging, the connection between said cylinder means and said live truck levers including a cylinder lever having a bracket secured thereto and slidably supporting said cylinder lever on said truck frame.

17. In a brake rigging, the combination of a truck frame, wheels supporting said truck frame, live truck levers on one side of each wheel, connecting means between said live truck levers, dead truck levers on the other side of each wheel, tie straps connecting said truck levers on each side of each wheel, and operating cylinder means disposed between said live truck levers and operatively connected to pairs of said live truck levers for controlling said rigging, the connection between said cylinder means and said live truck levers including a cylinder lever having a bracket secured thereto and slidably supporting said cylinder lever on said truck frame.

18. In a truck, the combination of a truck frame having a side frame, spaced wheels in supporting relation to said truck frame, brake rigging associated with said wheels, and operating means for said brake rigging, said operating means including a brake cylinder supported by said side frame, substantially horizontal cylinder levers operatively connected to each other and to said brake cylinder and provided with means on said cylinder levers for slidably supporting said cylinder levers on said truck frame, one of said levers being a live lever, said levers being connected to said brake rigging.

19. In a truck, the combination of a truck frame having a side frame, spaced wheels in supporting relation to said truck frame, brake rigging associated with said wheels, and operating means for said brake rigging, said operating means including a brake cylinder supported by said side frame between adjacent wheels, substantially horizontal cylinder levers operatively connected to each other and to said brake cylinder and provided with means on said cylinder levers for slidably supporting said cylinder levers on said truck frame, said levers being connected to said brake rigging.

20. In a truck, the combination of a truck frame having a side frame, spaced wheels in supporting relation to said truck frame, brake rigging associated with said wheels, and operating means for said brake rigging, said operating means including a brake cylinder supported by said side frame, cylinder levers operatively connected to each other intermediate the ends thereof and to said brake cylinder adjacent their ends and provided with means on said cylinder levers for slidably supporting said cylinder levers on said truck frame, one of said levers being a live lever, said levers being connected to said brake rigging.

21. In a truck, the combination of a truck frame having a side frame, spaced wheels in supporting relation to said truck frame, brake rigging associated with said wheels, and operating means for said brake rigging, said operating means including a brake cylinder supported by said side frame between adjacent wheels, substantially horizontal cylinder levers operatively connected to each other intermediate the ends thereof and to said brake cylinder adjacent their ends and provided with means on said cylinder levers for slidably supporting said cylinder levers on said truck frame, said levers being connected to said brake rigging.

WALTER H. BASELT.